US008824811B2

(12) United States Patent
Huang et al.

(10) Patent No.: US 8,824,811 B2
(45) Date of Patent: Sep. 2, 2014

(54) LCD MODULE, PORTABLE ELECTRONIC DEVICES AND DISPLAYING METHOD THEREOF

(75) Inventors: Jih-Hsin Huang, Taoyuan County (TW); Hsi-Chieh Peng, Taoyuan County (TW); Cheng Lo, Taoyuan County (TW); Hsi-Cheng Yeh, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 109 days.

(21) Appl. No.: 13/413,415

(22) Filed: Mar. 6, 2012

(65) Prior Publication Data

US 2013/0235054 A1 Sep. 12, 2013

(51) Int. Cl.
*G06K 9/34* (2006.01)

(52) U.S. Cl.
USPC ........... 382/232; 382/233; 382/245; 382/246; 382/250; 382/251; 345/545; 345/547; 345/530

(58) Field of Classification Search
CPC .................. G09G 2320/0204; G09G 2320/00; G09G 2320/02; G09G 2340/00
USPC ......... 382/232, 233, 236, 245–246, 250, 251; 345/530, 545, 547
See application file for complete search history.

(56) References Cited

U.S. PATENT DOCUMENTS

| | | | | |
|---|---|---|---|---|
| 6,137,466 | A * | 10/2000 | Moughanni et al. | 345/99 |
| 2002/0004694 | A1* | 1/2002 | McLeod et al. | 701/29 |
| 2002/0190943 | A1 | 12/2002 | Kayada et al. | |
| 2006/0284901 | A1* | 12/2006 | Ng | 345/691 |
| 2006/0284904 | A1* | 12/2006 | Ng | 345/691 |
| 2007/0198348 | A1* | 8/2007 | Tung | 705/14 |
| 2008/0174606 | A1 | 7/2008 | Rengarajan et al. | |
| 2010/0033496 | A1 | 2/2010 | Mancuso | |
| 2010/0123727 | A1 | 5/2010 | Kwa et al. | |

FOREIGN PATENT DOCUMENTS

TW 455835 B 9/2001

OTHER PUBLICATIONS

Charles Poynton: "Chroma subsampling notation"; Jan. 24, 2008 Charles Poynton 1 of 3; XP055115608; Retrieved from the Internet: URL: http://www.poynton.com/PDFs/Chroma_subsampling_notation.pdf (retrieved on Apr. 28, 2014); pp. 1-3.

* cited by examiner

*Primary Examiner* — Ali Bayat
(74) *Attorney, Agent, or Firm* — Birch, Stewart, Kolasch & Birch, LLP

(57) ABSTRACT

A portable electronic device is provided. The portable electronic device includes a processor for providing encoding data and an LCD module coupled to the processor. The processor includes an encoder for encoding a frame data to generate the encoding data. The LCD module includes a driver and an LCD coupled to the driver. The driver includes a decoder for decoding the encoding data to obtain an image data. The LCD displays the image data.

13 Claims, 3 Drawing Sheets

LCD MODULE, PORTABLE ELECTRONIC DEVICES AND DISPLAYING METHOD THEREOF

BACKGROUND OF THE INVENTION

1. Field of the Invention

The invention relates to a liquid crystal display (LCD) module, and more particularly to an LCD module of a portable electronic device.

2. Description of the Related Art

In recent years, liquid crystal displays (LCD) have been widely used in portable electronic devices, such as mobile phones, tablet PCs and so on. Due to an increase in display size and enhancement of imaging quality, e.g. resolution, contrast, etc., power consumption when displaying images has increased for a portable electronic device.

Therefore, a displaying method is desired to decrease the power consumption when displaying image for a portable electronic device.

BRIEF SUMMARY OF THE INVENTION

LCD modules, portable electronic devices and a displaying method thereof are provided. An embodiment of a portable electronic device comprises a processor and an LCD module coupled to the processor. The processor provides encoding data, and comprises an encoder for encoding a frame data to generate the encoding data. The LCD module comprising: a driver, comprising: a decoder, decoding the encoding data to obtain an image data; and an LCD coupled to the driver, displaying the image data.

Furthermore, an embodiment of an LCD module is provided. The LCD module comprises a driver and an LCD coupled to the driver. The driver comprises: a control unit, receiving encoding data; a storage unit coupled to the control unit, storing the encoding data; and a decoder, decoding the encoding data to obtain an image data. The LCD displays the image data.

Moreover, an embodiment of a displaying method is provided. The method comprises: encoding a frame data by a processor, to obtain encoding data; transmitting the encoding data to an LCD module; decoding the encoding data by a driver of the LCD module, to obtain an image data; and displaying the image data on an LCD of the LCD module.

In addition, another embodiment of a displaying method is provided. The displaying method comprises: encoding a frame data stored in a first storage unit by a processor, to obtain encoding data, wherein the first storage is implemented in the processor; transmitting the encoding data to an LCD module and storing the encoding data to a second storage unit of the LCD module; decoding the encoding data stored in the second storage unit by a driver of the LCD module, to obtain an image data; and displaying the image data on an LCD of the LCD module. The processor enters an idle mode after the encoding data is stored in the second storage unit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
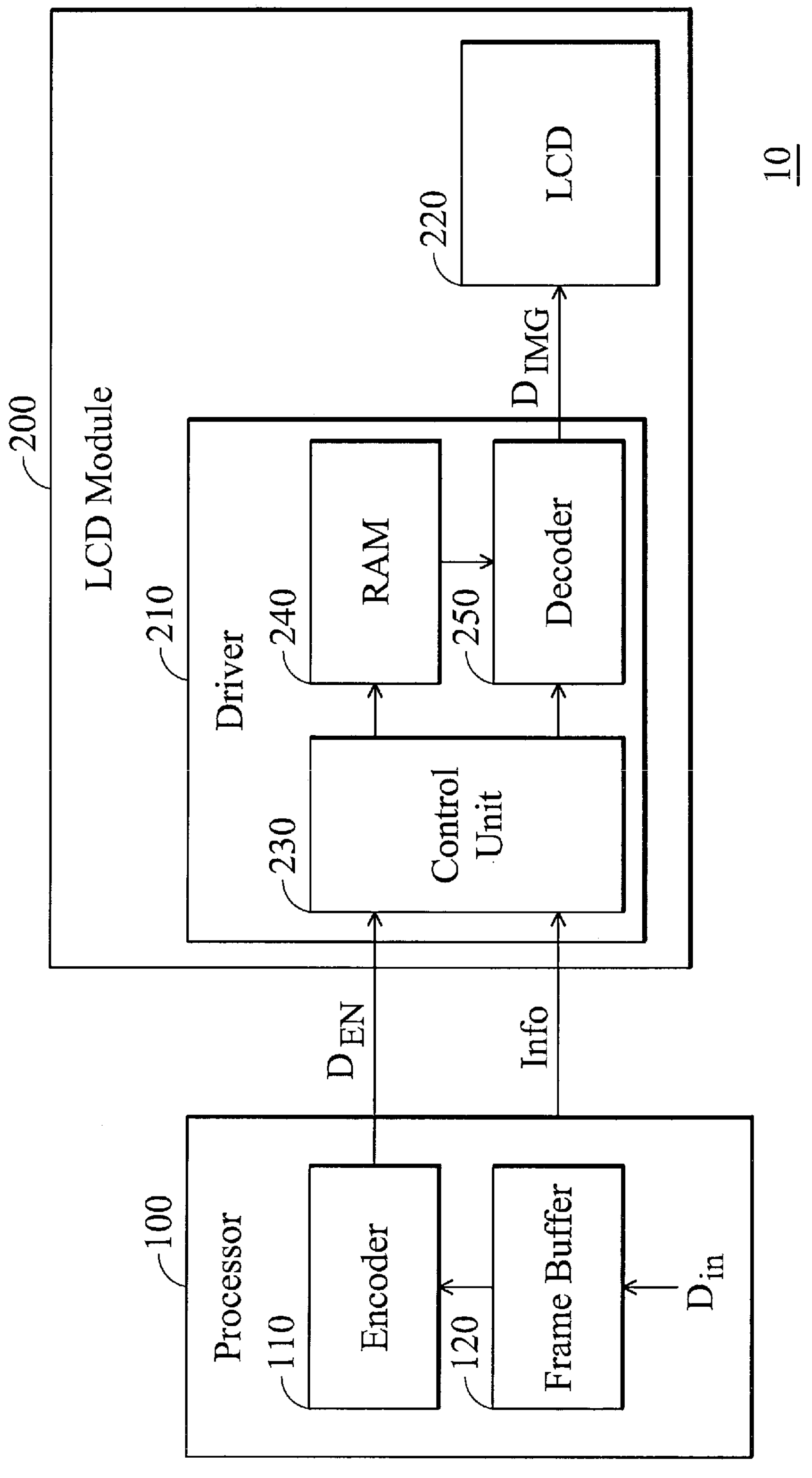
FIG. 1 shows a portable electronic device according to an embodiment of the invention.

FIG. 1 shows a portable electronic device 10 according to an embodiment of the invention. The portable electronic device 10 comprises a processor 100 and an LCD module 200, wherein the LCD module 200 displays an image corresponding to data $D_{EN}$ according to the data $D_{EN}$ provided by the processor 100. The processor 100 comprises an encoder 110 and a frame buffer 120. The frame buffer 120 is used to store a frame data $D_{in}$ received by the processor 100, wherein the frame data $D_{in}$ is an image frame data which may be an image data generated by the processor 100, an image data stored in a memory (e.g. EEPROM) of the portable electronic device 10 or an image data from an external storage device (a SD card). Next, the encoder 110 reads the frame data $D_{in}$ from the frame buffer 120 and performs an encoding procedure, so as to compress the frame data $D_{in}$ to generate the encoding data $D_{EN}$. In one embodiment, by appropriately choosing a compression technology (e.g. converting RGB to YUV), a data quantity of the encoding data $D_{EN}$ can be decreased to a half of a data quantity of the frame data $D_{in}$. For example, it is assumed that each pixel comprises 8-bit data $D_R$, 8-bit data $D_G$ and 8-bit data $D_B$. If 2×2 pixels of data $D_{in}$ are compressed, 96 bits of RGB data is needed to be compressed, i.e. (8+8+8)×4. Next, the 96 bits of RGB data are converted to 96 bits of YVU data, to perform compression. Because human eyes are insensitive to variations of chromatic aberrations Y and U, the data $D_U$ and the data $D_V$ of the total pixels are averaged, i.e. averaging the 2×2 pixels of data $D_U$ (8×4 bits) and data $D_V$ (8×4 bits), to obtain an average data $D_U$ (8 bits) and an average data $D_V$ (8 bits) of one pixel. Thus, the encoding data comprises the 2×2 pixels of data $D_V$ (8×4 bits), the average data $D_U$ (8 bits) and the average data $D_V$ (8 bits), which in total is 48 bits. Therefore, the data quantity of the encoding data $D_{EN}$ can be decreased to a half of the data quantity of the frame data $D_{in}$. Next, the processor 100 transmits the encoding data $D_{EN}$ to the LCD module 200. Furthermore, before transmitting the encoding data $D_{EN}$, the processor 100 may provide state information Info to the LCD module 200 first, wherein the state information Info is used to indicate whether the processor 100 is to enter an idle mode.

The LCD module 200 comprises a driver 210 and an LCD 220. The driver 210 comprises a control unit 230, a random access memory (RAM) 240 and a decoder 250. The control unit 230 receives the state information Info and the encoding data $D_{EN}$ from the processor 110. Next, the control unit 230 selectively transmits the encoding data $D_{EN}$ to the RAM 240 or the decoder 250 according to the state information Info. For example, when the state information Info indicates that the processor is still being operated in a normal mode, the control unit 230 transmits the encoding data $D_{EN}$ to the decoder 250. Next, the decoder 250 performs a decoding procedure, so as to decompress the encoding data $D_{EN}$ to obtain an image data $D_{IMG}$. Next, the driver 210 transmits the image data $D_{IMG}$ to the LCD 220 for display. Due to the processor 100 still being operated in a normal mode, the processor 100 may encode a subsequently obtained frame data $D_{in}$, to transmit to the LCD 200. In one embodiment, the processor 100 may ignore the transmission of the state information info, i.e. the processor 100 only transmits the encoding data $D_{EN}$ to the LCD module 200. In addition, when the state information Info indicates that the processor 100 is to enter an idle mode, the control unit 230 may transmit the encoding data $D_{EN}$ to the RAM 240 for storage. When the encoding data $D_{EN}$ is successfully stored in the RAM 240, the processor 100 enters an idle mode (or a sleep mode). Next, the decoder 250 reads the encoding data $D_{EN}$ from the RAM 240 and performs a decoding procedure, so as to decompress the read encoding data $D_{EN}$. Next, the driver 210 transmits the image data $D_{IMG}$ to the LCD 220 for display.

In FIG. 1, the processor 100 only transmits the encoding data $D_{EN}$ with less data quantity to the LCD module 200 and not the frame data $D_{in}$ with much data quantity. Therefore, data bandwidth transmitted between the processor 100 and the LCD module 200 is decreased, and the amount of transmission lines and connection pins between the processor 100 and the LCD module 200 are also decreased, such that manufacturing cost and printed circuit board (PCB) area of the portable electronic device 10 are reduced. Because the data quantity to be transmitted is decreased, power consumption of the portable electronic device 10 is also decreased. Furthermore, in the LCD module 200, following a decrease in the data quantity of the encoding data $D_{EN}$, a storage capacity of the RAM 240 is also decreased. In other words, the storage capacity of the RAM 240 is smaller than the storage capacity of the frame buffer 120. For example, when the data quantity of the encoding data $D_{EN}$ decreases to a half of the data quantity of the frame data $D_{in}$, the storage capacity of the RAM 240 is a half of the storage capacity of the frame buffer 120. Therefore, manufacturing cost of the LCD module 200 is reduced.

Figure 2:
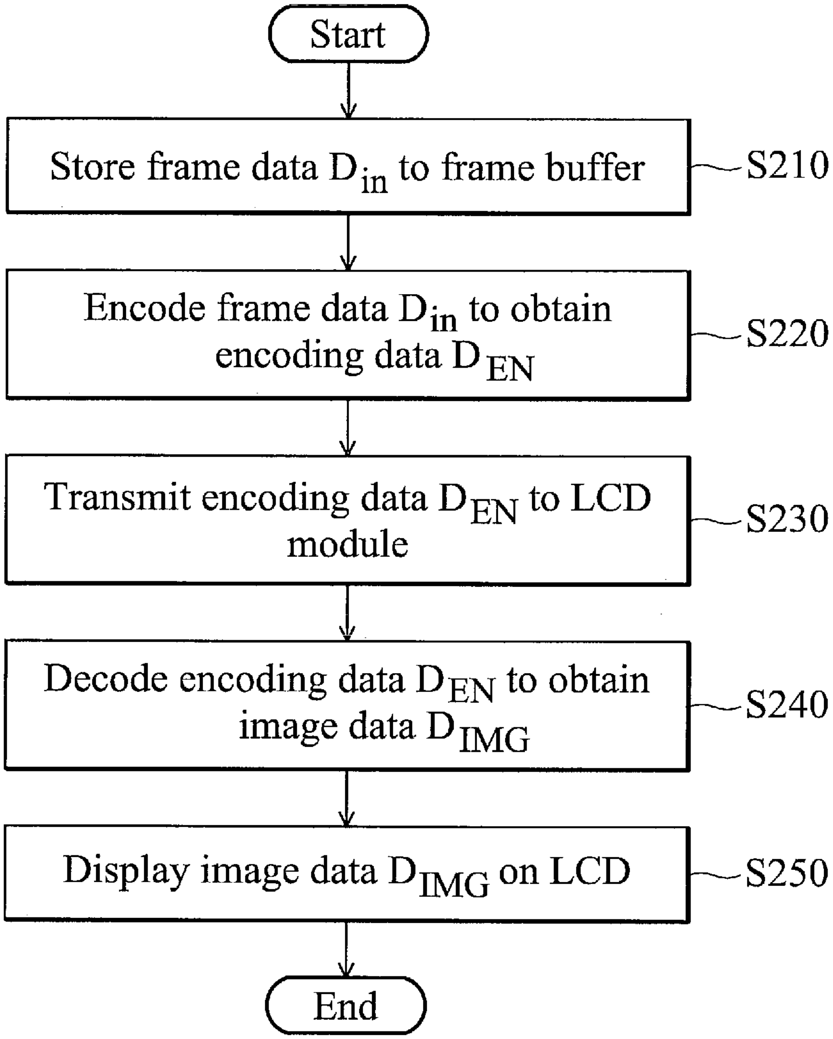
FIG. 2 shows a displaying method for the portable electronic device of FIG. 1 according to an embodiment of the invention.

FIG. 2 shows a displaying method for the portable electronic device 10 of FIG. 1 according to an embodiment of the invention. Referring to FIG. 1 and FIG. 2, first, the processor 100 stores the obtained frame data $D_{in}$ to the frame buffer 120 (step S210). As described above, the frame data $D_{in}$ may be an image data generated by the processor 100, an image data stored in a memory (e.g. EEPROM) of the portable electronic device 10 or an image data from an external storage device. Next, the encoder 110 of the processor 100 encodes and compresses the frame data $D_{in}$ stored in the frame buffer 120, to obtain the encoding data $D_{EN}$ (step S220), wherein the data quantity of the encoding data $D_{EN}$ is smaller than the data quantity of the frame data $D_{in}$. Thus, transmission bandwidth between the processor 100 and the LCD module 200 is decreased, and then the power consumption of the portable electronic device 10 is also decreased. Next, the processor 100 transmits the encoding data $D_{EN}$ to the LCD module 200 (step S230). In one embodiment, before the encoding data $D_{EN}$ is transmitted, the state information Info is transmitted to the control unit 230 of the LCD module 200 first, wherein the state information Info is a message regarding that the processor 100 continues to operate in a normal mode. Thus, the control unit 230 transmits the encoding data $D_{EN}$ to the decoder 250. Furthermore, if the control unit 230 only receives the encoding data $D_{EN}$ and not the state information Info, the control unit 230 also transmits the encoding data $D_{EN}$ to the decoder 250. Next, the decoder 250 of the LCD module 200 decodes the encoding data $D_{EN}$, to obtain the image data $D_{IMG}$ (step S240). Next, the image data $D_{IMG}$ is transmitted to the LCD 220 for display (step S250).

Figure 3:
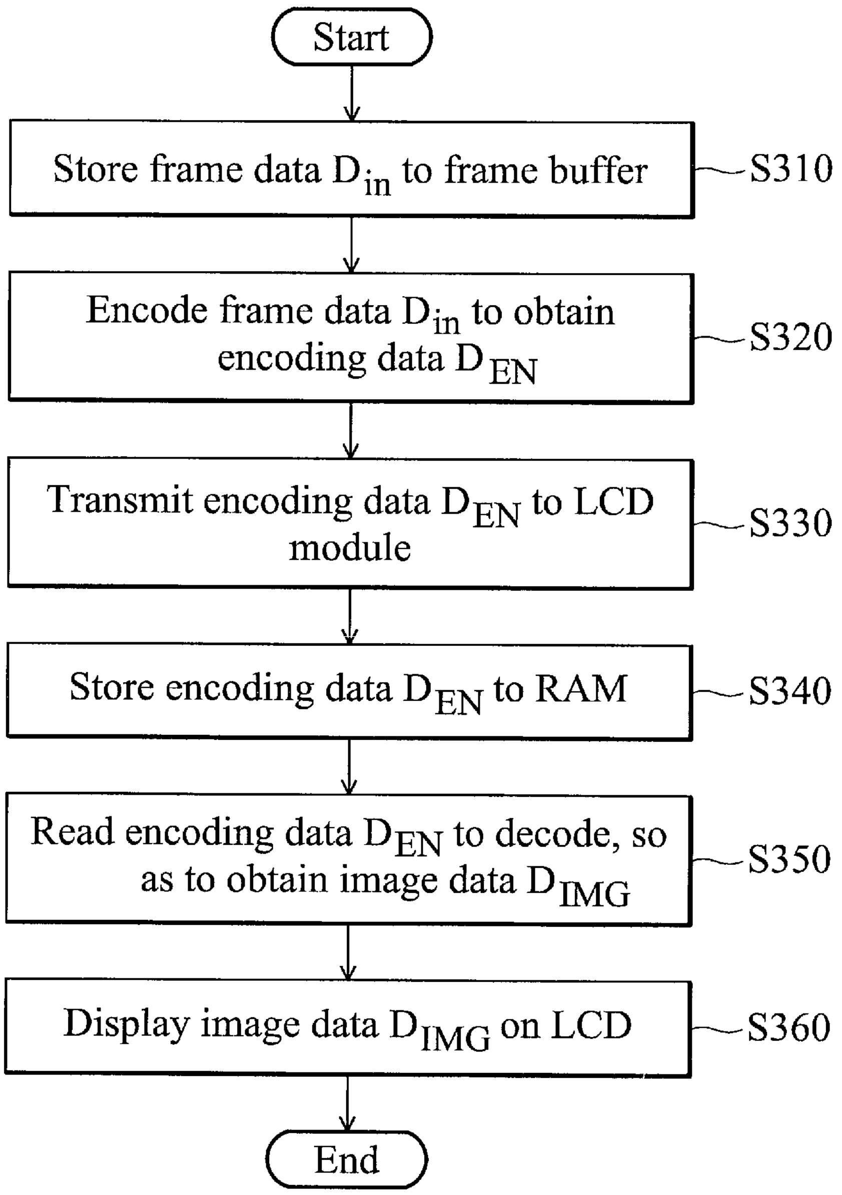
FIG. 3 shows a displaying method for the portable electronic device of FIG. 1 according to another embodiment of the invention.

FIG. 3 shows a displaying method for the portable electronic device 10 of FIG. 1 according to another embodiment of the invention. Referring to FIG. 1 and FIG. 3, first, the processor 100 stores the obtained frame data $D_{in}$ to the frame buffer 120 (step S310). As described above, the frame data $D_{in}$ may be an image data generated by the processor 100, an image data stored in a memory (e.g. EEPROM) of the portable electronic device 10 or an image data from an external storage device. Next, the encoder 110 of the processor 100 encodes and compresses the frame data $D_{in}$ stored in the frame buffer 120, to obtain the encoding data $D_{EN}$ (step S320), wherein a data quantity of the encoding data $D_{EN}$ is smaller than a data quantity of the frame data $D_{in}$. Thus, transmission bandwidth between the processor 100 and the LCD module 200 is decreased, and then the power consumption of the portable electronic device 10 is also decreased. Next, the processor 100 transmits the encoding data $D_{EN}$ to the LCD module 200 (step S330). Before the encoding data $D_{EN}$ is transmitted, the processor 100 transmits the state information Info to the control unit 230 of the LCD module 200 first, wherein the state information Info is a message regarding the processor 100 entering an idle mode. Thus, the control unit 230 stores the encoding data $D_{EN}$ to the RAM 240 (step S340). After the encoding data $D_{EN}$ is successfully stored in the LCD module 200, the processor 100 enters the idle mode. Thus, power consumption of the portable electronic device 10 is further decreased. Next, the decoder 250 reads the encoding data $D_{EN}$ from the RAM 240 to decode, so as to obtain the image data $D_{IMG}$ (step S350). Next, the image data $D_{IMG}$ is transmitted to the LCD 220 for display (step S360). It is to be noted that the storage capacity of the RAM 240 is smaller than the storage capacity of the frame buffer 120. Therefore, manufacturing cost of the LCD module is reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LCD module, comprising:

a driver, comprising:

a control unit, receiving encoding data;

a storage unit coupled to the control unit, storing the encoding data; and a decoder, decoding the encoding data to obtain an image data; and an LCD coupled to the driver, displaying the image data, wherein the encoding data is provided by an external processor, and wherein the control unit further receives state information from the external processor before receiving the encoding data.

2. The LCD module as claimed in claim 1, wherein the control unit selectively transmits the encoding data to the storage unit or the decoder according to the state information.

3. The LCD module as claimed in claim 2, wherein when the state information indicates that the external processor is to enter an idle mode, the control unit transmits the encoding data to the storage unit for storage, and the decoder decodes the encoding data stored in the storage unit to obtain the image data.

4. The LCD module as claimed in claim 3, wherein when the state information indicates that the external processor is operating in a normal mode, the control unit transmits the encoding data to the decoder, and the decoder decodes the encoding data from the control unit to obtain the image data.

5. The LCD module as claimed in claim 1, wherein the storage unit is a random access memory (RAM).

6. A portable electronic device, comprising:
- a processor, providing encoding data and comprising:
  - an encoder, encoding a frame data to generate the encoding data; and
- an LCD module coupled to the processor, comprising:
  - a driver, comprising:
    - a control unit, receiving the encoding data;
    - a storage unit coupled to the control unit, storing the encoding data; and
    - a decoder, decoding the encoding data to obtain an image data; and
  - an LCD coupled to the driver, displaying the image data,
- wherein the control unit further receives state information from the processor before receiving the encoding data.

7. The portable electronic device as claimed in claim 6, wherein the control unit selectively transmits the encoding data to the storage unit or the decoder according to the state information.

8. The portable electronic device as claimed in claim 7, wherein when the state information indicates that the processor is to enter an idle mode, the control unit transmits the encoding data to the storage unit for storage, and the decoder decodes the encoding data stored in the storage unit to obtain the image data.

9. The portable electronic device as claimed in claim 8, wherein when the state information indicates that the external processor is operating in a normal mode, the control unit transmits the encoding data to the decoder, and the decoder decodes the encoding data from the control unit to obtain the image data.

10. The portable electronic device as claimed in claim 6, wherein the storage unit is a random access memory (RAM).

11. A displaying method, comprising:
- encoding a frame data stored in a first storage unit to provide encoding data by a processor;
- obtaining the encoding data by an LCD module;
- storing the encoding data to a second storage unit of the LCD module;
- obtaining state information from the processor;
- decoding the encoding data stored in the second storage unit by a driver of the LCD module, to obtain an image data when the state information indicates that the processor is to enter an idle mode; and
- displaying the image data on an LCD of the LCD module,
- wherein the processor enters the idle mode after the encoding data is stored in the second storage unit.

12. The displaying method as claimed in claim 11, wherein a storage capacity of the second storage unit is smaller than a storage capacity of the first storage capacity.

13. The displaying method as claimed in claim 11, wherein the processor and the LCD module are implemented in a portable electronic device, and the second storage unit is a random access memory (RAM).

* * * * *